Figure 1:
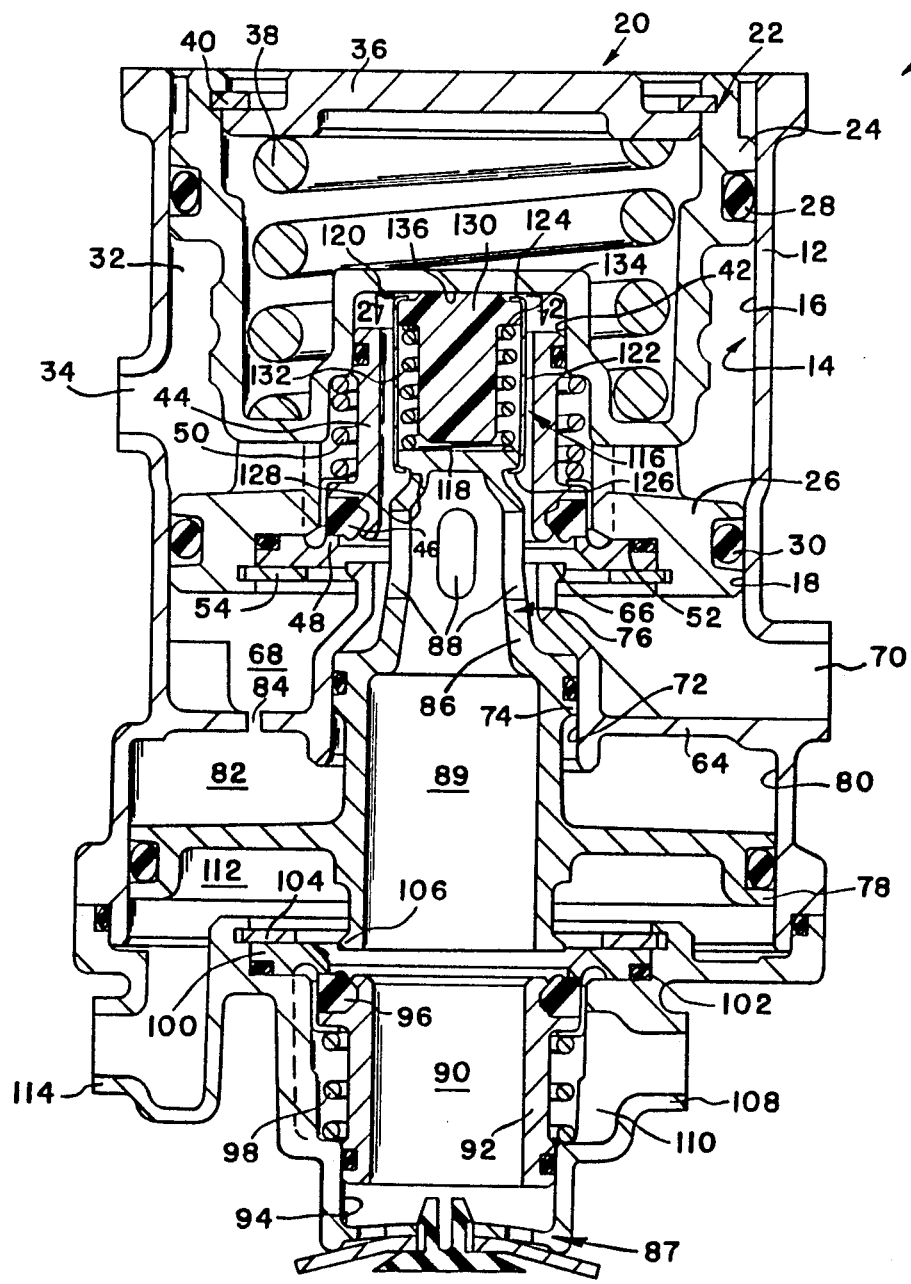

United States Patent [19]
Johnson

[11] Patent Number: 4,729,607
[45] Date of Patent: Mar. 8, 1988

[54] DUAL CIRCUIT BRAKE VALVE DIFFERENTIAL PRESSURE CONTROL MECHANISM

[75] Inventor: Duane R. Johnson, Wellington, Ohio

[73] Assignee: Allied Corporation, Morristown, N.J.

[21] Appl. No.: 9,426

[22] Filed: Feb. 2, 1987

Related U.S. Application Data

[63] Continuation-in-part of Ser. No. 831,891, Feb. 24, 1986, Pat. No. 4,691,968, and Ser. No. 876,154, Jun. 19, 1986, abandoned.

[51] Int. Cl.$^4$ ............................................. B60T 15/02
[52] U.S. Cl. .................................. 303/52; 137/627.5; 303/56
[58] Field of Search ................. 137/627.5; 303/52, 50, 303/54, 56, 7-9, 6, 40

[56] References Cited

U.S. PATENT DOCUMENTS

| | | | |
|---|---|---|---|
| 3,580,646 | 5/1971 | Ternent | 353/52 |
| 3,712,685 | 1/1973 | Hoffman | 303/52 |
| 3,758,168 | 9/1973 | Parsons | 303/52 |
| 3,992,065 | 11/1976 | Pekrul | 303/52 X |
| 4,553,789 | 11/1985 | Pugh et al. | 303/54 |
| 4,660,894 | 4/1987 | Bartholomew et al. | 303/54 |
| 4,679,594 | 7/1987 | Fogg | 303/52 X |
| 4,691,968 | 9/1987 | Pugh et al. | 303/52 |

FOREIGN PATENT DOCUMENTS

| | | |
|---|---|---|
| 1655873 | 3/1971 | Fed. Rep. of Germany . |
| 2825559 | 12/1979 | Fed. Rep. of Germany . |
| 1039837 | 8/1966 | United Kingdom . |
| 2150659 | 7/1985 | United Kingdom . |

OTHER PUBLICATIONS

Patent Abstract of Japan, vol. 9, No. 57, of 13 Mar. 1985, JP 59-192662.

Primary Examiner—Douglas C. Butler
Attorney, Agent, or Firm—Ken C. Decker; W. N. Antonis

[57] ABSTRACT

A dual circuit brake valve is provided with a delivery differential control mechanism which controls the differential between the delivery pressures of the primary and secondary braking circuits. The delivery differential control mechanism includes a spring retainer which is mounted on the end of the stem of the relay valve and which receives a spring-biased plunger. The plunger engages with the actuating member during the brake application to thereby transfer the force of the spring to the relay member and therefore to the valve members of the secondary circuit. This transfer of the spring force reduces the crack open pressure of the valve members controlling communication through the secondary circuit, to thereby reduce the differential between the pressures generated and the primary and secondary circuits.

6 Claims, 2 Drawing Figures

DUAL CIRCUIT BRAKE VALVE DIFFERENTIAL PRESSURE CONTROL MECHANISM

This application is a continuation-in-part of U.S. Pat. Application Ser. Nos. 831,891, filed Feb. 24, 1986 now U.S. Pat. Nos. 4,691,968 and 876,154, filed June 19, 1986 now abandoned.

This invention relates to a dual circuit brake valve for a pneumatically operated braking system.

Modern braking systems require separate, independent braking circuits to assure operation of the vehicle service brakes even if one of the circuits fails. Pressure in the separate braking circuits is controlled by a dual circuit brake valve. These valves are operated by a conventional treadle mounted in the vehicle operator's compartment to substantially simultaneously communicate pressure through the primary and secondary braking circuits when a brake application is affected. A typical such prior art dual circuit brake valve is illustrated in U.S. Pat. No. 3,580,646, issued May 25, 1971.

Figure 2:
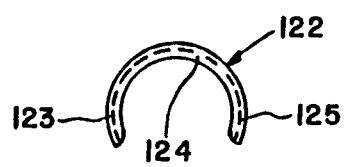

Valves of this type must be designed to minimize the inherent sequential operation of the primary and secondary braking circuits, and must minimize the resulting pressure differential between the primary and secondary braking circuits. Accordingly, it is necessary to minimize the "crack open" force of the secondary braking circuit. This is accomplished in the above-identified patent by two opposing springs and a special bolt, nut, and spring retainer. This mechanism is obviously quite complex. The device illustrated in the above-identified U.S. Pat. Application 876,154, filed June 19, 1986 uses a differential spring and plunger to transfer a predetermined force from the primary control device to the relay control device. It has been found that the difference in the pressures between the primary and secondary braking circuits, referred to as the "differential", is very sensitive to the differential spring load. The effective length of the differential spring space can be substantially different in two apparently identical valves because they have shorter or longer spring spaces due to tolerances. The resulting spring load is increased or decreased accordingly. The present invention permits precise control of the differential spring load by using a spring retainer which snaps on the stem of the relay piston. Since the length of the spring retainer can be relatively easily controlled, the resulting differential spring force is also controlled. Accordingly, a more precise control of the differential between the primary and secondary braking circuits is possible. These and other features of the invention will be apparent from the following specification with reference to the accompanying drawings, in which;

FIG. 1 is a longitudinal cross-section view of a dual circuit brake valve made pursuant to the teaching of the present invention; and FIG. 2 is a cross-sectional view of the spring retainer used in the brake valve of FIG. 1 taken substantially along lines 2—2 of FIG. 1.

Referring now to the drawing, a dual circuit brake valve generally indicated by the numeral 10 includes a housing 12 defining a bore generally indicated by the numeral 14. Bore 14 is stepped to define a larger diameter portion 16 and a smaller diameter portion 18. A control actuating member or plunger assembly generally indicated by the numeral 20 is slidably mounted in the bore 14. Control actuating member 20 includes a primary piston 22 which includes bearing members 24, 26 which project radially from the primary piston 22 and extend circumferentially thereabout. The bearing members 24, 26 carry circumferentially extending seals 28, 30. Bearing member 24 and seal 28 slidably engage the larger portion 16 of the bore 14, and bearing member 26 and its associated seal 30 slidably engage the smaller diameter portion 18 of the bore 16.

The bearing members 24, 26 cooperate with the wall of the bore 14 and the primary piston 22 to define an inlet chamber 32 therebetween which is communicated with an inlet port 34. Since bearing member 24 is slidably mounted in the larger portion of the bore 14 and the bearing member 26 is slidably mounted in the smaller portion of the bore 14, a net effective area is defined on the primary piston 22. Air pressure communicated through the inlet port 34 acting upon this effective area tends to urge the control actuating member 20 upwardly viewing FIG. 1.

Control actuating member 20 further includes a treadle plate 36 which is engaged by the operating treadle (not shown) mounted in the vehicle operator's compartment and which applies a downward force on treadle plate 36 when a brake application is effected. A graduating spring 38 yieldably urges the treadle plate 36 into engagement with a stop ring 40 mounted on the primary piston 22. The primary piston 22 further defines an inner bore 42 which slidably receives a valve poppet 44 which carries a circumferentiallY extending sealing member 46. A spring 50 urges valve poppet 44 into sealing engagement with a valve seat 48 which is carried by the primary piston 22. Valve seat 48 is a circumferentially extending ring which is received in a recess 52 which extends circumferentially around the lower portion of the primary piston 22 viewing the Figure, and which is held in place by a snap ring 54. Accordingly, the control actuating member 20 consists of a removable cartridge comprising the primary piston 22, the valve poppet 44, and the valve seat 48, and their associated springs, seals and retaining or snap rings. This cartridge may be removed and replaced as a unit when the valve is serviced, and is installed in the housing 12 as a unit when the valve is manufactured, thus simplifying manufacturing and servicing of the valve assembly 10.

Housing 12 further includes an inwardly extending partition 64 that divides the housing into the primary section which receives the control actuating member 20 and a secondary section. Partition 64 carries a circumferentially extending valve seat 66 which is positioned to be engaged by the seal 46 carried by the poppet 44. Partition 64 cooperates with the primary piston 22 to define an annular delivery chamber 68 therebetween which is communicated with a primary circuit outlet or delivery port 70.

The partition 64 defines a bore 72 which slidably receives a bearing portion 74 of a relay actuating member generally indicated by the numeral 76. Relay actuating member 76 further includes another bearing surface 78 that is slidably engaged with portion 80 of the bore 14. Relay actuating member 76 cooperates with the partition 64 to define a relay cavity 82 therebetween which communicates with delivery chamber 68 through an aperture 84. Relay actuating member 76 further includes a projecting stem 86 which projects into the aperture defined within the annular poppet 44. Stem 86 is provided with elongated apertures 88 to communicate delivery chamber 68 with an exhaust port generally indicated by the numeral 87 which is provided on the lower most portion of the housing 12 viewing the Figure. The relay actuating member 76 defines a passage 89 therewithin which cooperates with corresponding passage 90 defined within an annular poppet member 92 to communicate the apertures 88 with the exhaust port 87.

Poppet 92 is slidably mounted in a bore 94 defined within the housing 12 and carries a circumferentially extending seal 96. A spring 98 yieldably urges the poppet member 92 into sealing engagement with an annular valve seat 100. The valve seat 100 is similar to the valve seat 48 and consists of an annular ring which is releasably held by a snap ring 104 in a circumferentially extending recess 102 provided in the wall of the housing 12. The relay actuating member 76 is provided with a circumferentially extending valve seat 106 at its lower most portion viewing the Figure which is adapted to sealingly engage the seal 96 when the relay actuating member 76 is urged downwardly viewing the Figure.

An inlet or supply port 108 is communicated to the secondary braking system and communicates fluid into an inlet chamber 110 which is normally closed by engagement of the seal 96 carried by the poppet 92 against the valve seat 100. The relay actuating member 76 cooperates with the housing 12 to define a delivery chamber 112 therebetween, which is communicated to a delivery port 114 which is also connected to the secondary braking circuit.

A reaction force transfer mechanism generally indicated by the numeral 116 is mounted on the end 118 of the relay actuating member 76 which faces the corresponding end 120 of the control actuating member 22. Mechanism 116 includes a generally C-shaped spring retainer 122 defining yieldable portions 123, 125 which is provided with inwardly projecting lips 124, 126 on opposite ends thereof. As illustrated in the drawing, the end 118 of the relay actuating member 76 is provided with a circumferentially extending groove 128. The groove 128 receives the lip 126 when the retainer 122 is snapped upon the end of the relay actuating member 76. Before installation of the retainer 122 on the relay actuating member 76, a plunger 130 is installed within the retainer 122. A spring 132 bears against the end 118 and against a shoulder 134 defined on the plunger 130 to urge the latter into yieldable engagement with the lip of 124. The plunger 130 includes a projecting portion 136 which projects above the end of the lip 124 and is adapted to engage the end 120 of the control actuating member 22. As illustrated in FIG. 2, the yieldable portions 123, 125 yield to permit the lip 126 to be snapped into groove 128.

In operation, the various components of the valve 10 are illustrated in the Figure in the positions which they assume when the brakes of the vehicle are released. In this condition, supply air is communicated through the inlet port 34 into the inlet chamber 32. However, since the spring 50 urges the seal 46 against the valve seat 48, further communication of fluid pressure into the valve housing 12 through the inlet port 34 is blocked. Because of the unbalanced area on the control actuating member 20 as discussed hereinabove, air pressure communicated into the chamber 32 acts across this unbalanced area to provide a net upward force on the control actuating member 20 to urge the latter into the position illustrated in the Drawing. At the same time, air is communicated through the secondary braking circuit through the supply or inlet port 108 into the inlet chamber 110. Further communication of air pressure into the valve housing 12 through inlet or supply port 108 is blocked due to the sealing engagement of the seal 96 against the valve seat 100. The delivery port 70 and delivery chamber 68 are communicated to the exhaust port 87 through the slots 88 and passages 89 and 90. Similarly, delivery port 114 and delivery chamber 112 are communicated to the exhaust port 87 through the passage 90.

When a brake actuation is effected, the operator operates the aforementioned treadle, which forces the treadle plate 36 downwardly viewing the Figure, thereby partially compressing graduating spring 38. Accordingly, primary piston 22 is also forced downwardly, thereby urging the seal 46 into sealing engagement with the valve seat 66, to thereby cut off communication between the delivery port 70 and the exhaust port 87. This position, in which the seal 46 is engaged with both the valve seat 66 and the valve seat 48 is called the "lapped position".

As the control actuating member 20 is moved into the lapped position, movement of the primary piston 22 relative to the relay actuating member 76 causes the projecting portion 136 of the plunger 130 to engage the end 120 of the control actuating member 20. Accordingly, as the plunger 130 is forced out of engagement with the lip 124 due to the engagement of the projecting portion 136 with the end 120, the force of the spring 132 is transferred to the relay actuating member 76, forcing the latter downwardly viewing FIG. 1 to bring the valve seat 106 into sealing engagement with the seal 96. The force of the spring 132 is less than the force of the spring 98 plus the load exerted by the fluid pressure in chamber 110, so that the seal 96 is not urged away from the seat 100. However, the force of the spring 132 is a significant fraction of that of the spring 98, so the forces biasing the seal 96 in engagement with the seat 100 are substantially reduced, thereby requiring only a minimal "crack open" force to be applied to the poppet 92 in order to urge the seal 96 away from the valve seat 100.

Additional downward movement (viewing the Figure) of the treadle plate 36 is sufficient to urge the valve seat 48 away from the seal 46, which remains engaged with the valve seat 66. Accordingly, fluid pressure is communicated from the inlet port 34 to the delivery or outlet port 70 through the valve seat 48. However, the higher pressure thereby created at the delivery port 70 reacts against the primary piston 22, the lower most face of which is exposed to the fluid pressure level in the delivery chamber 68. Accordingly, the control actuating member 20 is urged upwardly viewing the Figure, until the fluid pressure force applied to the primary piston 24 by pressure at delivery port 70 balances the compression of the spring 38 generated by operation of the treadle in the operator's compartment. At the same time, the increased pressure in the delivery chamber 68 is communicated through the aperture 84 into the relay chamber 82, where it acts upon the relay actuating member 76 to urge the latter downwardly viewing the Figure. Since the relay actuating member 76 has already been moved into the lapped position thereby relieving substantially the pressure exerted by sprinq 98, the valve poppet 96 will almost immediately be moved away from the valve seat 100 to allow pressure to communicate to the delivery port 114. Accordingly, when pressure in delivery chamber 112 balances the pressure in relay chamber 82, the poppet 92 is allowed to move back to the lapped position.

If the vehicle operator increases the pressure on plate 36, additional pressure will be communicated to the delivery ports 70 and 114 as described hereinabove. If the pressure on the plate 36 is reduced, thereby reducing the compression of graduating spring 38, the then higher pressure at the delivery port 70 exerts an upward force on the primary piston 22, thereby cracking the valve seat 66 open to allow fluid pressure to escape through the exhaust port 87 until the pressure at delivery port 70 again balances the compression of graduating spring 38, whereupon the valve members move back to the lapped position. A similar pressure change is effected in relay chamber 82, thereby controlling the pressure in the secondary circuit accordingly.

When the brakes of the vehicle are released, the graduating spring urges the treadle plate 36 back to the position illustrated in the drawing. The higher pressure in the inlet chamber 32 urges the control actuating member 20 back to the position illustrated. The relay piston 76 is urged to the position illustrated by the higher pressure in delivery chamber 112, as it escapes to atmosphere through exhaust port 87.

I claim:

1. Dual circuit brake valve comprising a housing having a pair of inlet ports and a pair of outlet ports, each of said outlet ports being associated with a corresponding one of said inlet ports, a pair of valve members for controlling communication between each inlet port and its corresponding outlet port, manual valve actuating means for controlling one of said valve members, said manual valve actuating means including a control actuating member slidably mounted in said housing and movable toward and away from a position operating said one valve member to initiate communication between one of said inlet ports and its corresponding outlet port, a relay actuating member slidably mounted in said housing and movable therein relative to said control actuating member to permit the latter to move away from the relay actuating member during brake release, said relay actuating member being responsive to the pressure differential between said outlet ports for operating the other valve member in response to operation of the one valve member, said actuating members having corresponding facing ends, and reaction force transfer means carried by one of said actuating members for transferring a predetermined force to said relay actuating member upon operation of said manual valve actuating means, said reaction force transfer means including a spring retainer projecting from the facing end of said one actuating member toward the forcing end of the other actuating member, stop means carried by said spring retainer, a plunger slidably mounted in said spring retainer, and a spring yieldably urging said plunger toward engagement with said stop means and toward the facing end of the other actuating member for engagement therewith upon operation of said manual valve actuating means to effect a brake application to thereby transfer the force generated by said spring to the relay actuating member when the plunger is engaged with the forcing end of the other actuating member when a brake application is effected.

2. Dual circuit brake valve as claimed in claim 1, wherein said stop means is a radially inwardly projection lip on one end thereof, said spring yieldably urging said plunger into engagement with said lip, said plunger including a poriton projecting from said one end of the spring retainer for engagement with the facing end of the other actuating member when a brake application is effected.

3. Dual circuit brake valve as claimed in claim 2, wherein said one actuating member is the relay actuating member and the other actuating member is the control actuating member.

4. Dual circuit brake valve as claimed in claim 3, wherein said relay actuating member includes a fluid pressure responsive portion and a stem projecting from said fluid pressure responsive portion and terminating in the forcing end of the relay actuating member, said stem and said spring retainer including means for coupling the spring retainer onto the stem.

5. Dual circuit brake valve as claimed in claim 4, wherein said coupling means includes a groove circumscribing said stem and a radially inwardly projecting lip on said spring retainer, said last-mentioned lip being received in said groove.

6. Dual circuit brake valve as claimed in claim 5, wherein said spring retainer including an axially extending opening defined by a pair of opposite yieldable portions of said spring retainer, said yieldable portions yielding to permit said last mentioned lip to be snapped into said groove.

* * * * *